Sept. 16, 1941.   O. W. SJOGREN   2,256,220
DISK GANG ASSEMBLY
Filed Oct. 4, 1939
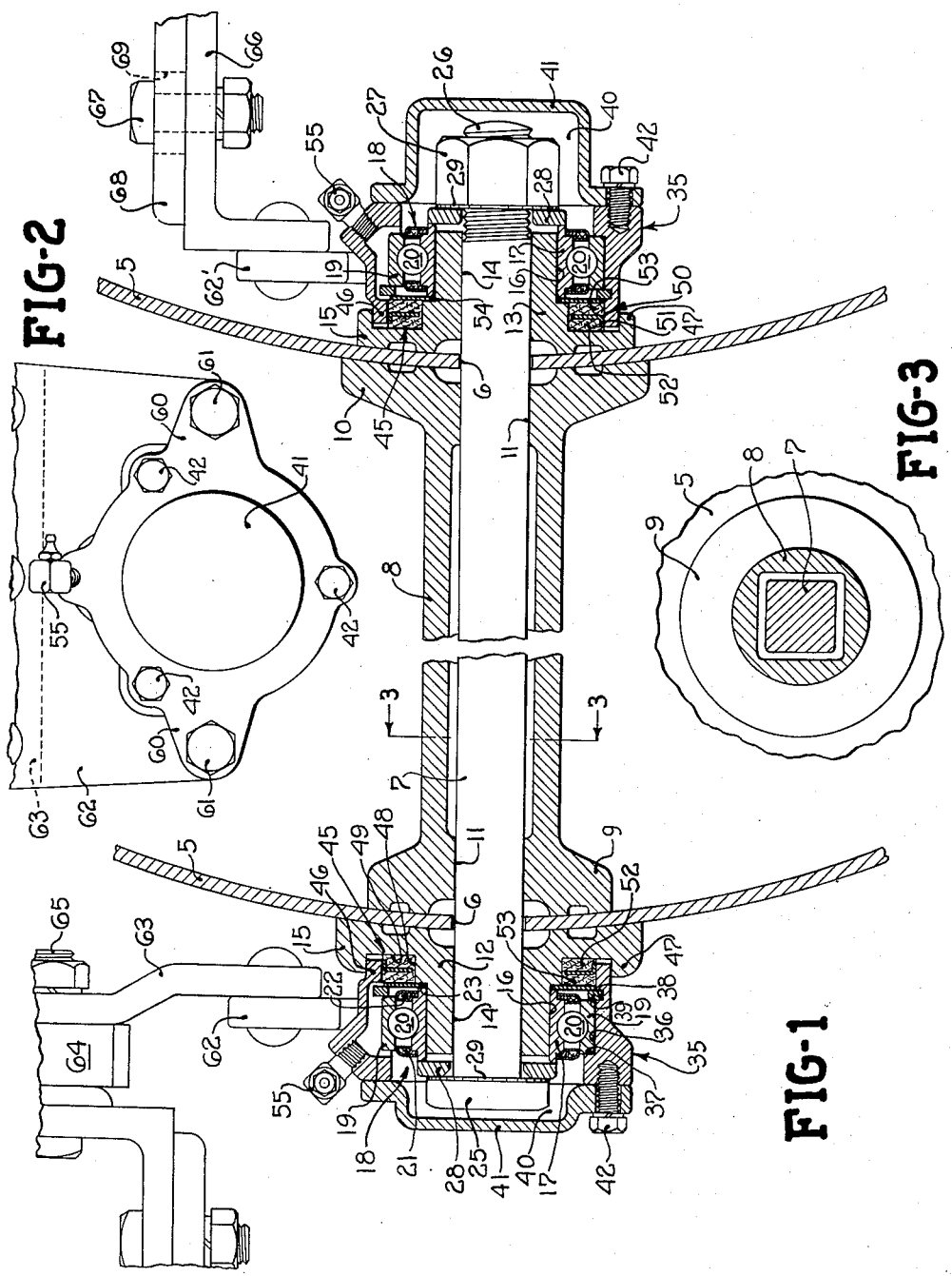
INVENTOR:
OSCAR W. SJOGREN
BY
ATTORNEYS.

Patented Sept. 16, 1941

2,256,220

UNITED STATES PATENT OFFICE 2,256,220

DISK GANG ASSEMBLY

Oscar W. Sjogren, Huntington Park, Calif., assignor to Killefer Manufacturing Corporation, Los Angeles, Calif., a corporation of California Application October 4, 1939, Serial No. 297,841

11 Claims. (Cl. 97—220)

The present invention relates to disk gang assemblies and has for its principal object and general nature the provision of a novel and improved disk gang construction, and more particularly it is an object of this invention to provide a disk gang supported on antifriction bearings which are suitably enclosed to protect them from the influx of sand and loose dirt under the severe conditions to which dirt working disk gangs are subjected. This invention is in the nature of an improvement by way of simplification over the enclosed bearing gang assembly disclosed in Patent No. 2,135,192 granted November 1, 1938, to Mitchell, Sjogren and Wadelton.

These and other objects and advantages of this invention will be apparent after a consideration of the following description, reference being had to the appended drawing, in which—

Figure 1 is a sectional elevation taken along the center line of a disk harrow gang embodying the principles of my invention;

Figure 2 is an end view of one of the bearings showing the method of mounting the bearing in the harrow frame; and Figure 3 is a sectional view taken along the line 3—3 in Figure 1.

Referring now to the drawing, the disk gang assembly comprises a plurality of ground working disks 5 of the conventional concavo convex type having a square aperture 6 in the center thereof to receive a gang bolt 7 of square cross section. The disks 5 are held in spaced apart relation by means of spacers or spools 8 which have end flanges 9, 10 for bearing against the surfaces of the disks 5. The spools 8 are provided with a central aperture 11 of square shape and adapted to slidably receive the gang bolt 7. Although only one spacer is shown in the drawing it is broken to indicate that any number of disks and spoons can be mounted on the gang bolt 7. A pair of end caps 12, 13 are mounted at opposite ends of the gang assembly and have square apertures 14 adapted to receive the square gang bolt 7. The end caps are provided at their inner ends with radially outwardly extending flanges 15 which bear against the outer surfaces of the end disks 5. The outer end of each end cap is reduced in diameter to provide a cylindrical mounting surface 16 on which is mounted the inner race 17 of an anti-friction type bearing indicated generally by the reference numeral 18. The bearing 18 is also provided with an outer race 19 and between the inner and outer races 17, 19 are confined a plurality of balls 20 which roll in suitable grooves in the inner and outer races, as is well known in the art. A pair of annular seals 21, 22 of conventional type are provided in each end of the races and serve to retain grease or other lubricant within the bearing and to exclude dirt and foreign objects. Each of the end caps 12, 13 is provided with a radially outwardly extending shoulder 23 against which the inner bearing race 17 is clamped by means of the main gang bolt 7, as will now be described.

The bolt 7 is provided at one end with a head 25 and at the other end it is turned to provide a cylindrical portion 26 which is threaded to receive a nut 27. It will be seen from the drawing that the cylindrical bearing supporting portion 16 of each of the end caps is made slightly shorter than the lower race 17 so that the latter overhangs the end of the end cap a slight amount. A pair of washers 28 are disposed on the gang bolt 7 between the head 25 and the nut 27 and each of the overhanging outer edges of the inner races 17, respectively. Suitable gaskets 29 are also disposed under the head 25 and nut 27 to prevent lubricant from flowing along the gang bolt 7 into the spacing spools 8. It is now evident that when the gang bolt nut 27 is tightened on the threads 26, the disks 5, spacers 8, end caps 12, 13, and the inner bearing races 17 are drawn tightly together into a rigid unitary structure, pressure being applied through the bolt head 25 and nut 27 through the washers 29 to the outer edges of the inner races 17 and thence through the shoulders 23 to the end caps 12, 13 which press against the disks 5. The outer bearing races 19 are securely mounted within a pair of bearing hubs or housings 35 and fit snugly within cylindrical supporting surfaces 36 and against shoulders 37 near the outer ends of the housings 35. The outer races are held against the shoulders 37 by means of retaining rings 39 which snap into grooves 38 provided in the housings 35. Lubricant-tight enclosures 40 are formed by providing outer covers 41 for the housings 35 and securely fixed over the outer ends thereof by means of bolts 42. Sealing means, indicated generally by reference numeral 45, are provided between each of the stationary bearing hubs 35 and the end caps 12, 13, respectively, as will now be described.

Each of the hub members 35 is provided at its inner end with a rim 46 and the end cap is recessed to receive the outer surface of the rim 46 with a reasonably close fit to exclude dirt from the bearing as much as possible without causing binding or rubbing between the rim 46 and the overhanging flange 47 of the end cap. The sealing means 45 is contained within an enclosure formed by the inner surface of the hub rim 46 spaced radially outwardly from a cylindrical sealing surface 48 on the end cap. A radially outwardly extending surface 49 on the flange portion 15 of the end cap forms the third side of the seal enclosure. A partition in the form of a cupped metal washer 50 is supported on the rim 46 of the housing 35 by pressing the flange portion 51 of the washer 50 tightly within the inner surface of the rim 46. The partition extends from the rim 46 in a radial plane nearly to the cylindrical sealing surface 48 of the end cap but with sufficient clearance between the inner edge of the partition and the cylindrical sealing surface 48 to provide for relative rotation therebetween. A sealing ring 52, made of felt or other suitable resilient material, is snugly retained between the partition 50 and the radially extending sealing surface 49, the inner edge of the ring bearing against the cylindrical sealing surface 48. A second resilient sealing ring 53 is disposed on the opposite side of the partition member 50 and is held against the latter by means of a retaining ring or washer 54, which is tightly clamped against the shoulder 23 between the shoulder 23 and the inner bearing race 17. The outer edge of the retaining washer 54 extends nearly to the inner surface of the hub member 35, sufficient clearance being provided to accommodate relative rotation between the hub and the retaining ring. In operation, the sliding fit between the housing rim 46 and the end cap flange 47 prevents the influx of coarse dirt so that only dust and fine sand is permitted to enter the sealing enclosure. In order for any dust to pass into the bearing enclosure, it must work its way inwardly either between the felt and the radial sealing surface 49 or between the felt and the partition 50, then pass around the inner edge of the partition 50 and again work its way outwardly between the felt 53 and either the partition 50 or the sealing ring 54. Thus it is evident that this novel sealing means 45 effectively protects the bearings from dust and grit, for it is clear that the passage of the dust inwardly to the inner edge of the partition 50 is resisted by the centrifugal force set up by the rotating parts. This seal is also effective in preventing the escape of lubricant from the bearing enclosure, for in order to escape the lubricant must first work its way inwardly against centrifugal force and around the inner edge of the partition 50 and then work its way outwardly once more past the outer felt or sealing ring 52. Additional protection for the ball bearings is provided by the sealing rings 21, 22 between the bearing races themselves. Lubricant is supplied to the bearing enclosures through lubricant fittings 55 of any suitable type and it will be evident to those skilled in the art that once the bearing enclosures are filled with lubricant it will seldom be necessary to replenish the supply.

Each of the bearing hubs or housings 35 is supported on a pair of laterally extending ears or lugs 60 preferably formed integrally therewith and which are connected to a supporting yoke 62 by means of bolts 61. One of the yokes 62 is rigidly attached to a vertical plate 63 which is fixed to the harrow frame 64 by suitable bolts 65. The opposite yoke 62' is fixed to an angular member 66, the latter being bolted by means of a bolt 67 to a horizontal portion 68 of the harrow frame. The aperture 69 in the frame part 68 is made with sufficient clearance around the bolt to permit a limited horizontal adjustment of the angular support 66.

I do not intend my invention to be restricted to the exact details shown and described herein except as limited by the following claims.

I claim:

1. A disk gang assembly comprising a plurality of ground working disks, spacers between said disks, end caps at opposite ends of said assembly, bearing members mounted on said end caps, and a gang bolt extending through aligned openings in said disks, spacers, and caps and bearing against the outer ends of said bearing members to draw said assembly together into a rigid unitary structure.

2. A disk gang assembly comprising a plurality of ground working disks, spacers between said disks, end caps at opposite ends of said assembly, inner bearing members mounted on said end caps, a gang bolt extending through aligned openings in said disks, spacers, and caps and bearing against the outer ends of said bearing members to draw said assembly together into a rigid unitary structure, and a pair of outer bearing members embracing and supporting said inner bearing members, respectively, and adapted to be rigidly secured in a suitable gang frame.

3. A disk gang assembly comprising a plurality of ground working disks, spacers between said disks, end caps at opposite ends of said assembly, inner bearing members mounted on said end caps, a gang bolt extending through aligned openings in said disks, spacers, and caps and bearing against the outer ends of said bearing members to draw said assembly together into a rigid unitary structure, a pair of outer bearing members embracing and supporting said inner bearing members, respectively, and adapted to be rigidly secured in a suitable gang frame, enclosure caps secured over the outer ends of said outer bearing members, respectively, and sealing means between the inner ends of each pair of bearing members, respectively.

4. A disk gang assembly comprising a plurality of ground working disks, spacers between said disks, end caps at opposite ends of said assembly, said end caps having shoulders, inner bearing races mounted on said end caps against said shoulders, a gang bolt extending through aligned openings in said disks, spacers, and caps and bearing against the outer ends of said inner bearing races, drawing the latter tightly against said shoulders to secure said assembly together into a rigid unitary structure, outer bearing races embracing and supporting said inner races, respectively, and bearing housings for supporting said outer races and having means for securing the housings to a suitable gang frame.

5. A disk gang assembly comprising a plurality of ground working disks, spacers between said disks, end caps at opposite ends of said assembly, said end caps having shoulders, inner bearing races mounted on said end caps against said shoulders, a gang bolt extending through aligned openings in said disks, spacers, and caps and bearing against the outer ends of said inner bearing races, drawing the latter tightly against said shoulders to secure said assembly together into a rigid unitary structure, outer bearing races embracing and supporting said inner races, respectively, bearing housings for supporting said outer races and having means for securing the housings to a suitable gang frame, and dust sealing means disposed between said housings and said end caps, respectively.

6. A disk gang assembly comprising a plurality of ground working disks, spacers between said disks, end caps at opposite ends of said assembly, said end caps having shoulders, inner bearing races mounted on said end caps against said shoulders, a gang bolt extending through aligned openings in said disks, spacers, and caps and bearing against the outer ends of said inner bearing races, drawing the latter tightly against said shoulders to secure said assembly together into a rigid unitary structure, outer bearing races embracing and supporting said inner races, respectively, bearing housings for supporting said outer races and having means for securing the housings to a suitable gang frame, each of said end caps having a cylindrical sealing surface and an annular flange surface extending outwardly therefrom and each of said bearing housings having a rim encircling but spaced outwardly from said sealing surface, an annular partition fixed to said rim in dust tight relation thereto and extending inwardly nearly to said cylindrical surface, a resilient sealing ring disposed between said flange surface and said partition, a second sealing ring disposed on the other side of said partition, and a retaining ring clamped between said inner bearing race and said shoulder by means of said gang bolt for holding said second ring against said partition.

7. In an enclosed bearing for disk gangs and the like, an annular dust seal between a pair of housing members having radially spaced inner and outer cylindrical surfaces, respectively, comprising an annular partition fixed in a radial plane to one of said surfaces and extending nearly to the other of said surfaces, a ring of resilient sealing material disposed on each side of said partition, and retaining means disposed adjacent said rings and connected with the other of said surfaces for holding said rings against said partition.

8. In an enclosed bearing for disk gangs and the like, an annular dust seal between a pair of housing members having radially spaced inner and outer cylindrical surfaces, respectively, comprising an annular partition fixed in a radial plane to the outer of said surfaces and extending nearly to said inner cylindrical surface, a ring of resilient sealing material disposed on each side of said partition, and retaining means disposed adjacent said rings and connected with said inner surface for holding said rings against said partition.

9. In an enclosed bearing for a disk gang, an inner bearing member and an outer bearing housing, said inner member having a cylindrical sealing surface and an annular flange surface extending outwardly therefrom, said bearing housing having a rim encircling but spaced radially outwardly from said sealing surface, an annular partition fixed to said rim in dust tight relation thereto and extending inwardly nearly to said cylindrical surface, a resilient sealing ring disposed between said flange surface and said partition, a second sealing ring disposed on the other side of said partition, and a retaining ring fixed to said inner bearing member and extending outwardly nearly to said housing, for holding said second ring against said partition.

10. In an enclosed bearing for disk gangs and the like, having a pair of housing members having radially spaced inner and outer cylindrical surfaces, a pair of annular resilient sealing members between said surfaces, and retaining means therefor defining a U-shaped path of travel for dust into said housing which comprises a first or outer pass between said sealing members and said retaining means through which the dust must work radially inwardly, followed by a second pass through which the dust must work radially outwardly.

11. In an enclosed bearing for disk gangs and the like including a pair of housing members having radially spaced inner and outer cylindrical surfaces, the combination of annular resilient sealing means disposed between said surfaces, retaining means for said sealing means including radial faces bearing on opposite sides of said sealing means and connected to said inner cylindrical surface to rotate therewith, and means for preventing dust from working across said outer cylindrical surface between said faces.

OSCAR W. SJOGREN.